United States Patent [19]

Wan et al.

[11] Patent Number: 4,545,879

[45] Date of Patent: Oct. 8, 1985

[54] HYDRODESULPHURIZATION OF HYDROCRACKED PITCH

[75] Inventors: Jeffrey K. S. Wan, Kingston; Jaroslav F. Kriz, Nepean, both of Canada

[73] Assignee: Her Majesty the Queen in right of Canada, as represented by the Minister of Natural Resources, Ottawa, Canada

[21] Appl. No.: 630,741

[22] Filed: Jul. 13, 1984

[30] Foreign Application Priority Data

Jul. 14, 1983 [CA] Canada ................................. 432474

[51] Int. Cl.$^4$ ..................... B01J 19/12; C10G 32/00; C10L 9/04
[52] U.S. Cl. ........................... 204/158 R; 204/162 R; 208/244; 44/1 SR
[58] Field of Search ............... 208/217, 244; 44/1 SR; 204/162 R, 158 R

[56] References Cited

U.S. PATENT DOCUMENTS

| | | | |
|---|---|---|---|
| 2,550,089 | 4/1951 | Schlesman | 204/171 |
| 2,553,944 | 5/1951 | Schlesman | 204/171 |
| 3,503,865 | 3/1970 | Stone | 208/10 |
| 3,616,375 | 10/1971 | Inoue | 204/162 |
| 4,076,607 | 2/1978 | Zauitsanos et al. | 204/162 |
| 4,087,348 | 5/1978 | Baird, Jr. et al. | 208/108 |
| 4,113,606 | 9/1978 | Mulaskey | 208/244 |
| 4,123,230 | 10/1978 | Kirkbridge | 44/1 |
| 4,180,452 | 12/1979 | Sinor | 208/8 |
| 4,234,402 | 11/1980 | Kirkbridge | 204/162 |
| 4,279,722 | 7/1981 | Kirkbridge | 204/162 |
| 4,357,229 | 11/1982 | Bearden et al. | 208/217 |

*Primary Examiner*—Howard S. Williams
*Attorney, Agent, or Firm*—Finnegan, Henderson, Farabow, Garrett & Dunner

[57] ABSTRACT

An exceptionally effective technique has been developed for desulphurizing hydrocracked petroleum pitch containing organic molecules having at least some chemically bound sulphur. Particles of petroleum pitch and a para- or ferromagnetic material catalyst are intimately mixed and this mixture in the presence of hydrogen is subjected to microwave radiation so as to generate a high intensity oscillating electric field thereby releasing at least part of the chemically bound sulphur from the pitch as sulphur-containing gases without substantial increase of the temperature of the pitch and separating the sulphur containing gases thus formed. To avoid temperature rise during desulphurization, the microwave irradiation is preferably gated in a train of short pulses.

8 Claims, No Drawings

HYDRODESULPHURIZATION OF HYDROCRACKED PITCH

This invention relates to the treatment of hydrocarbon oils and, more particularly, to the desulphurization of petroleum pitch.

Hydrocracking processes for the conversion of heavy hydrocarbon oils to light and intermediate naphthas of good quality for reforming feedstocks, fuel oil and gas oil are well known. These heavy hydrocarbon oils can be such materials as petroleum crude oil, atmospheric tar bottom products, vacuum tar bottom products, heavy cycle oils, shale oils, coal-derived liquids, crude oil residuum, topped crude oils and the heavy bituminous oils extracted from oil sands.

A major emphasis in the hydrocracking of heavy oils and bitumens is placed on minimizing the yield of high-boiling pitch, i.e. materials boiling above 524° C. This material has a high content of undesirable components such as asphaltenes, minerals, organically bound sulphur, nitrogen and metals. The hydrocracking process may produce, depending on the quality of the feed, as much as 10 wt. % of the hydrocracked pitch in the total liquid product. This represents a very significant amount of pitch in view of the magnitude of upgrading and refining operations that must be accommodated on a commercial scale. In order for the hydrocracking process to be economic, there must be reasonable schemes for pitch utilization.

At present, the most appropriate use for pitch is as a source of energy. This can be achieved by direct combustion or indirectly through pitch conversion. The latter offers an attractive alternative as a source of hydrogen or additional liquid fuels. In each case, and particularly in the case of combustion, the high sulphur content in the pitch creates serious environmental problems. Stack gas scrubbing to remove $SO_2$ requires very costly additional equipment.

It would, therefore, be highly desirable to be able to pretreat the pitch feedstock in order to remove as much sulphur as possible in some form other than $SO_2$. By reducing the sulphur content of the feedstock to acceptable levels, the very expensive scrubbing step would no longer be required.

Sulphur levels in the hydrocracked pitch feedstock can, of course, be reduced by hydrodesulphurization, which is typically a catalytic process taking place at elevated temperatures and hydrogen pressure. Sulphur removal by hydrogen is an irreversible reaction which converts organic sulphur compounds into $H_2S$ and desulphurized organic compounds. The $H_2S$ containing off-gases can then be processed in a similar fashion to processing of product gas from the primary hydrocracking.

Unfortunately, very little of the available hydrodesulphurization technology can be applied to hydrocracked pitch. A major problem is the high coking propensity of pitch at elevated temperatures. Under conditions when coke beings to form, complete deactivation of the catalyst by coke deposits on its surface become very rapid. Additional poisoning of the catalyst surface occurs if the metal content of the pitch is high.

One such hydrodesulphurization process is described in U.S. Pat. No. 4,087,348 in which the heavy hydrocarbon feed stock is contacted with hydrogen and a reagent selected from alkaline earth metal hydrides, oxides and mixtures thereof. However, that process is carried out at temperatures in the range of 700° to 1500° F. and a high partial pressure ranging from about 1500 to 3000 psig. Thus it will be seen that the above process is being conducted at high temperatures with the associated coking problems.

It is also known from U.S. Pat. No. 4,234,402 that the sulphur content of crude petroleum can be reduced by subjecting a mixture of the crude petroleum and hydrogen to microwave energy.

According to the present invention it has been discovered that an exceptionally effective technique for desulphurizing hydrocracked petroleum pitch containing organic molecules having at least some chemically bound sulphur comprises the steps of effecting intimate mixing between the petroleum pitch and a para-or ferromagnetic material catalyst and subjecting this pitch-catalyst mixture in the presence of hydrogen to microwave radiation so as to generate a high intensity oscillating electric field thereby releasing at least part of the chemically bound sulphur from the pitch as sulphur-containing gases without substantial increase of the temperature of the pitch and separating the sulphur containing gases thus formed.

For use in the process of the invention, the pitch is preferably in particle form of a size suitable for the type of operation to be used, which usually will be fixed, moving or fluidized bed operation. The size of the pitch particles is not important except as it affects the operating conditions and therefore the overall economics of the process. The equipment used for crushing, grinding, or otherwise pulverizing pitch for use in the present process may be of known type to those skilled in the art, such as ball mill, rod mills, roller crushers, and the like. Where it is desired to operate at or close to atmospheric pressure, it is particularly advantageous to use very small particle sizes, e.g. particles having an average diameter which will pass a 100 mesh screen (Canada Standard Sieve), with 100–200 mesh particles being particularly preferred.

While it is not desired to be bound by theoretical considerations, in the present process wherein a mixture of powdered pitch, selected catalyst articles and hydrogen is subjected to the influence of microwaves, it is believed that the wave energy causes a localized temperature rise at the situs of each sulphur atom and activates the sulphur atoms so that they react with the adjacent hydrogen to form hydrogen sulphide which is removed as a gas. When the sulphur is associated with pitch the metal or metal hydride powder catalyst seems to be essential for the above reaction to take place. These catalysts provide large surface areas and it appears that upon irradiation of the metallic powder and associated powder pitch with high intensity microwaves, the microwave radiation greatly enhances the kinetic energy of the material adjacent the metal surface.

It is important for the success of this process that the temperature of the powdered pitch be kept below its melting point. It has been found that the sulphur can effectively be removed without substantially raising the temperature of the reaction mixture by gating the microwave irradiation in a train of short pulses.

The process can be carried out at low pressures near atmospheric, e.g. at 1 to 2 atmospheres, but higher pressures can be employed if desired. It is particularly advantageous to employ low pressure because less costly equipment is then sufficient.

The wave energy used in the present process is in the microwave range and it is particularly preferred to use microwave radiation in the range of 2–10 gigahertz (GHz). The equipment for generating microwaves is well known to those skilled in the art.

The catalyst used in the present process is a para- or ferromagnetic material and this is preferably a metal or metal hydride powder. Iron powder has been found to be particularly effective, while other suitable catalysts include alloys containing at least 2 metals selected from nickel, copper, lithium, lanthanum and calcium. Highly suitable such catalysts include $LaNi_5$ and $LiAlH_4$. The catalyst is typically in the form of particles of about the same size as the pitch particles.

Certain preferred embodiments of the present invention are illustrated by the following examples.

EXAMPLE 1

In order to demonstrate the process of the present invention on a laboratory scale, a pitch sample was obtained from a hydrocracking process. This pitch had the following properties:

TABLE 1

| Properties of pitch sample | |
|---|---|
| Carbon content, wt % | 80.42 |
| Hydrogen content, wt % | 6.49 |
| Sulphur content, wt % | 5.63 |
| Nitrogen content, wt % | 1.60 |
| Ash content, wt % | 5.29 |
| Vanadium content, ppm | 10.43 |
| Relative density, 15/15° C. | 1.21 |
| Conradson carbon residue, wt % | 62.5 |
| Pentane insolubles, wt % | 73.0 |
| Toluene insolubles, wt % | 18.1 |

The pitch was ground to −100 mesh and a series of test samples were prepared by mixing the powdered pitch with a variety of different catalysts. For each sample, two grams of pitch powder were mixed with two grams of catalyst.

The reaction cell was a Pyrex ® tube approximately 32 mm in diameter and 170 mm in length. The cell was fitted with a metal valve connectable to gas cylinders or gas monometers or directly to a vacuum pump. The cell was mounted for rotation within an enclosed stainless steel cavity containing a microwave generator.

For each experiment a sample of powdered pitch and catalyst was placed in the reaction cell. The cell was then first evacuated and thereafter pressurized with hydrogen gas at about 2 atmospheres (200 kPa). The sample cell was then placed in the microwave cavity, connected to the rotating device and then subjected to microwave irradiation. The irradiation was supplied by a 4 kw microwave generator operating at 2 GHz. The irradiator was operated at room temperature in the pulsed mode with an on-time of 0.5 second and an off time of 30 seconds to give a total irradiation time of 60 seconds.

Thereafter, the sample was evacuated for a few minutes to remove all gases. Toluene was then introduced into the cell to dissolve the residue pitch, thus separating and recovering the metal catalyst. The pitch was then recovered by distilling off the solvent and the sample was dried in a vacuum for 24 hours before analysis. Only $H_2S$ was quantitatively analyzed in the product gas.

Six different catalysts were tested in the above manner and the results obtained were as follows:

TABLE 2

| | Sulphur Removal | | |
|---|---|---|---|
| Catalyst | Sulphur Content before reaction (wt. %) | Sulphur Content after reaction (wt. %) | Sulphur removed (%) |
| 1. 3% CoO, 13% $MoO_3$ on alumina. | 4.21 | 4.12 | 2 |
| 2. 3% NiO, 15% $MoO_3$ on alumina. | 4.21 | 4.14 | 1.6 |
| 3. 6% Ni, 19% W on silica/alumina. | 4.21 | 4.18 | 0.7 |
| 4. Iron powder −325 mesh | 4.40 | <1.5 | 70 |
| 5. 50% iron powder 50% copper powder | 4.40 | <1.5 | 70 |
| 6. 70% iron powder 30% sodium hydride | 4.40 | 3.2 | 30 |

The first three catalysts are all commercial hydrocracking catalysts and it will be seen that they were almost totally ineffective in removing sulphur under the reaction conditions. However, at those same reaction conditions the metal powder catalysts of tests 4, 5 and 6 were highly effective in removing the sulphur.

EXAMPLE 2

In order to demonstrate the importance of the pulsed irradiation mode, the on-time was varied between 0.5 and 10 seconds with an off-time of 30 seconds. Using this arrangement, each sample was given a total irradiation time of 60 seconds and the bulk temperature of each sample was measured at the end of the irradiation time. The results obtained are shown below.

TABLE 3

| Time of Microwave pulse Irradiation (sec) | Temperature °C. | | | | | |
|---|---|---|---|---|---|---|
| | Pitch alone | NiO/ $MoO_3$ | CoO/ $MoO_3$ | Ni/ W | Iron Powder | Iron powder Copper powder |
| 0 | 21 | 21 | 21 | 21 | 21 | 21 |
| 0.5 | 21 | 21 | 21 | 21 | 23 | 23 |
| 1.0 | 21 | 21 | 21 | 21 | 29 | 29 |
| 2.0 | 21 | 21 | 22 | 21 | 47 | 48 |
| 5.0 | 21 | 21 | 23 | 22 | 95 | 97 |
| 10.0 | 21 | 22 | 24 | 23 | 158 | 160 |

From the above results, it will be seen that quite short-on pulses are desirable to avoid substantial increases in the bulk temperature of the sample being processed.

We claim:

1. A method of desulphurizing a petroleum pitch containing organic molecules having at least some chemically bound sulphur, comprising the steps of:
   (a) effecting intimate mixing between particles of petroleum pitch and particles of a para- or ferromagnetic metallic catalyst,
   (b) subjecting the pitch-catalyst particulate mixture in the presence of hydrogen to a train of short pulses of microwave radiation so as to generate a high intensity oscillating electric field thereby creating a microwave enhanced surface reaction whereby chemically bound sulphur in the pitch particles reacts with the hydrogen and is released from the pitch particles as sulphur-containing gases without substantial increase of the temperature of the pitch particles, and (c) separating the sulphur-containing gases thus formed.

2. The method according to claim 1 wherein the microwave radiation is in the range 2–10 GHz.

3. The method according to claim 2 wherein the catalyst is a metal or metal hydride powder.

4. The method according to claim 1 or 2 wherein the catalyst is iron powder.

5. The method according to claim 1 or 2 wherein the catalyst is an alloy containing at least two of nickel, copper, lithium, lanthanum and calcium.

6. The method according to claim 1 or 2 wherein the catalyst is an alloy containing at least two metals selected from nickel, copper and lithium.

7. The method according to claim 1 or 2 wherein the microwave irradiation is gated in a train of short pulses.

8. The method according to claim 1 wherein the pitch particles are of a −100 mesh size and the microwave irradiation in the presence of hydrogen is conducted at or near atmospheric pressure.

* * * * *